W. L. MARR.
COUPLING MEANS FOR TRANSMISSION MECHANISM.
APPLICATION FILED AUG. 27, 1908.
1,194,529.
Patented Aug. 15, 1916.
5 SHEETS—SHEET 1.
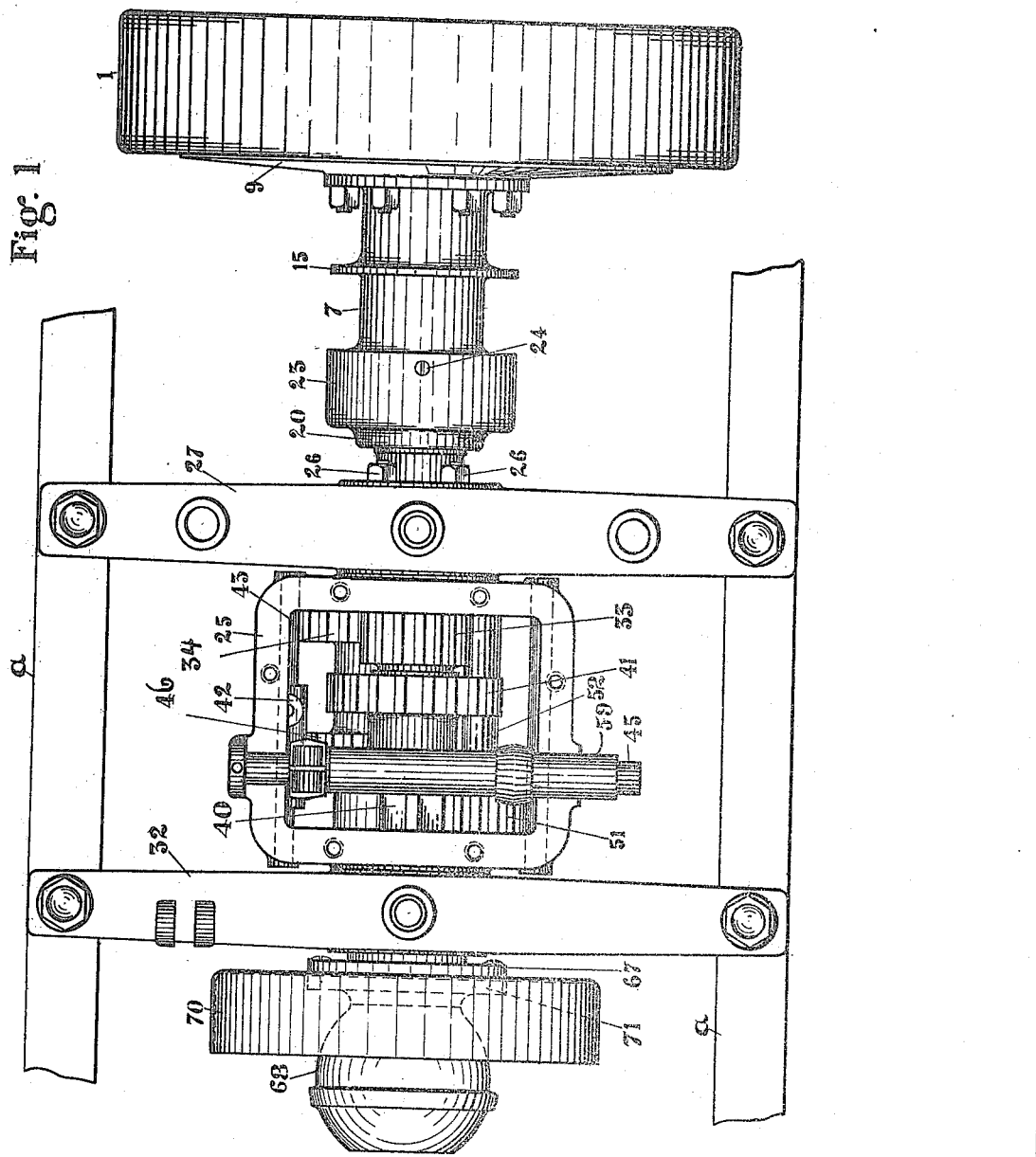
WITNESSES:
INVENTOR
Walter L. Marr
BY
ATTORNEYS W. L. MARR.
COUPLING MEANS FOR TRANSMISSION MECHANISM.
APPLICATION FILED AUG. 27, 1908.
1,194,529.
Patented Aug. 15, 1916.
5 SHEETS—SHEET 2.
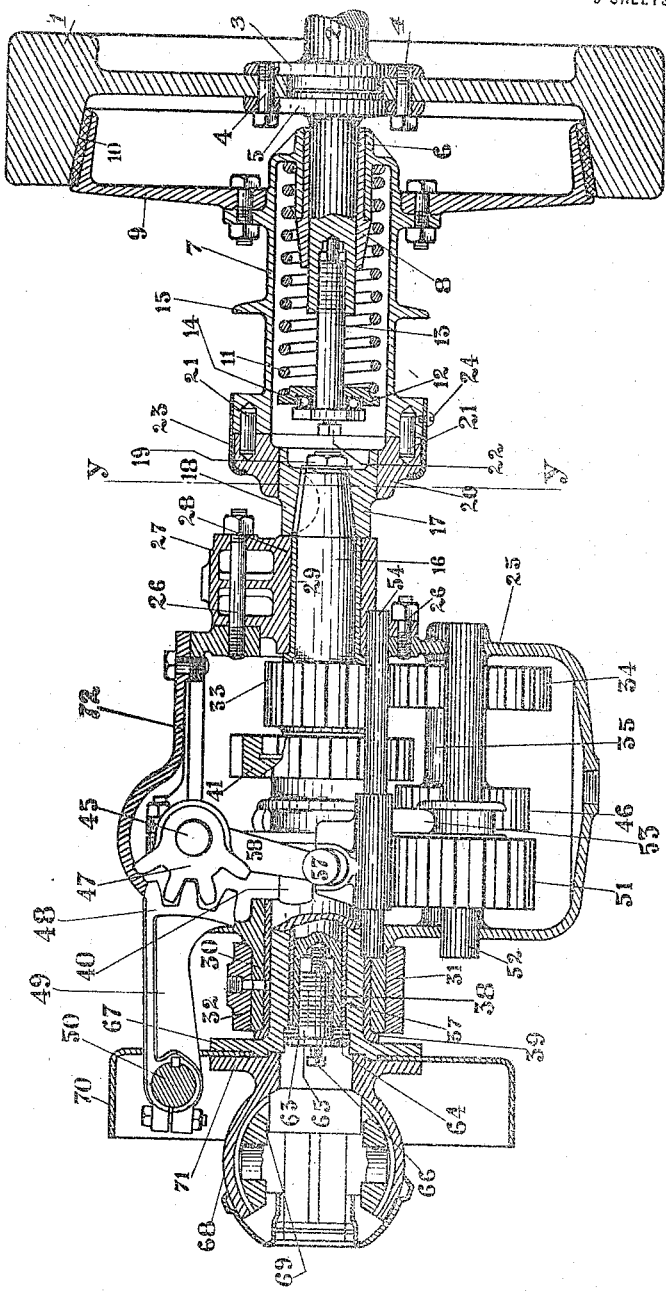
Fig. 2.
WITNESSES:
INVENTOR
Walter L. Marr
BY 
ATTORNEYS

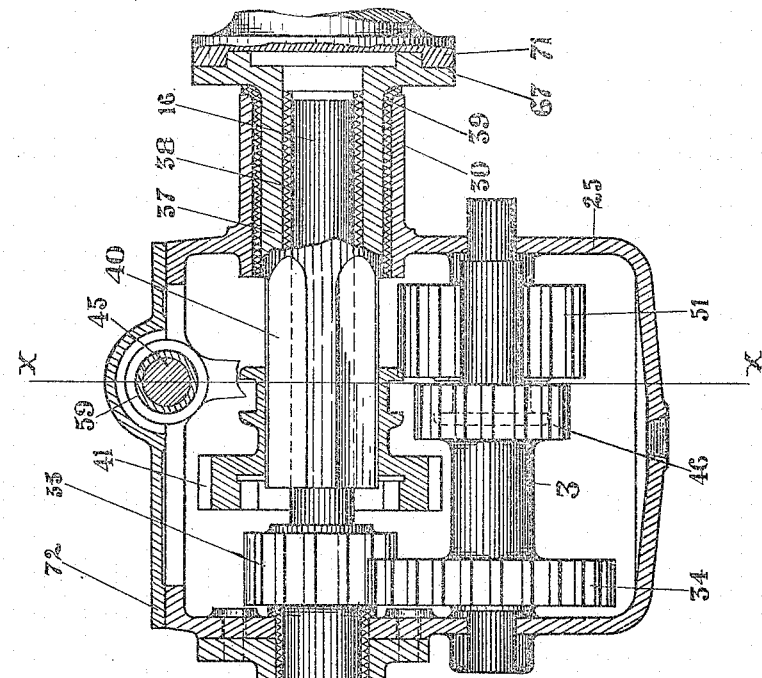

W. L. MARR.
COUPLING MEANS FOR TRANSMISSION MECHANISM.
APPLICATION FILED AUG. 27, 1908.

1,194,529.

Patented Aug. 15, 1916.
5 SHEETS—SHEET 4.

WITNESSES:

INVENTOR
Walter L. Marr
BY
ATTORNEYS

W. L. MARR.
COUPLING MEANS FOR TRANSMISSION MECHANISM.
APPLICATION FILED AUG. 27, 1908.
1,194,529.
Patented Aug. 15, 1916.
5 SHEETS—SHEET 5.
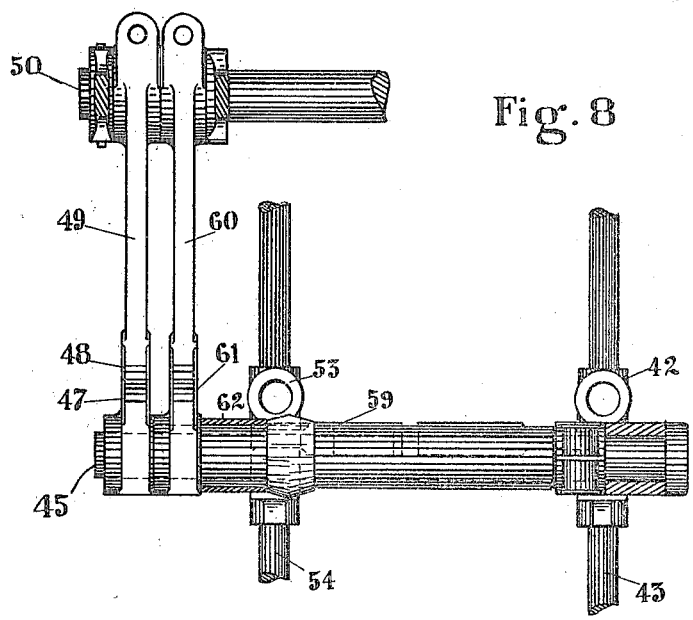
Fig. 8
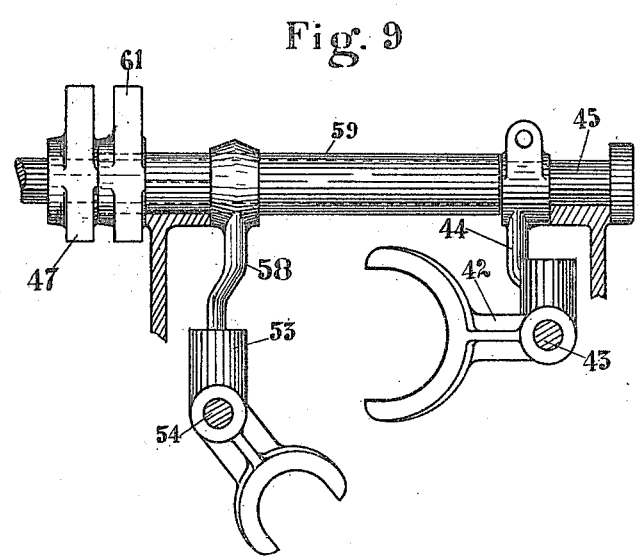
Fig. 9
WITNESSES:
INVENTOR
Walter L. Marr
BY 
ATTORNEYS

UNITED STATES PATENT OFFICE.

WALTER L. MARR, OF FLINT, MICHIGAN.

COUPLING MEANS FOR TRANSMISSION MECHANISM.

1,194,529.            Specification of Letters Patent.      Patented Aug. 15, 1916.

Application filed August 27, 1908. Serial No. 450,500.

*To all whom it may concern:*

Be it known that I, WALTER L. MARR, a citizen of the United States of America, residing at Flint, in the county of Genesee and State of Michigan, have invented certain new and useful Improvements in Coupling Means for Transmission Mechanism, of which the following is a specification, reference being had therein to the accompanying drawings.

This invention relates to coupling means for transmission mechanism wherein simplicity of construction and small number of working parts, together with maintenance of alinement under varying conditions especially adapt it for use on automobiles and to an arrangement of the connections to the other mechanisms permitting its removal for inspection or repair without disturbing or taking down any other parts.

The invention consists in the matters hereinafter set forth, and more particularly pointed out in the appended claims.

Figure 5:
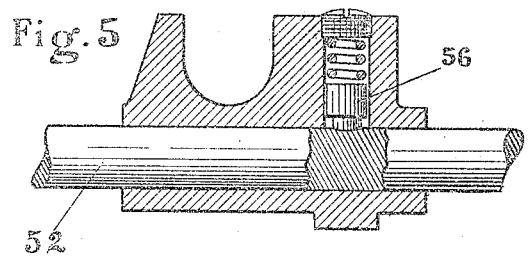
Figure 6:
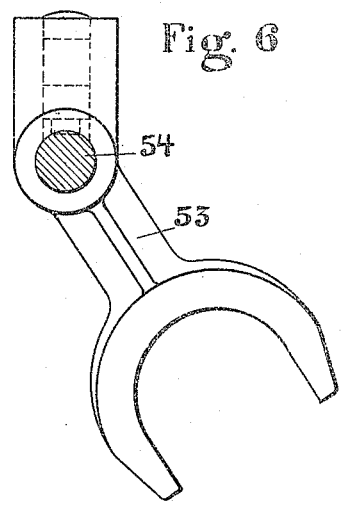
Figure 7:
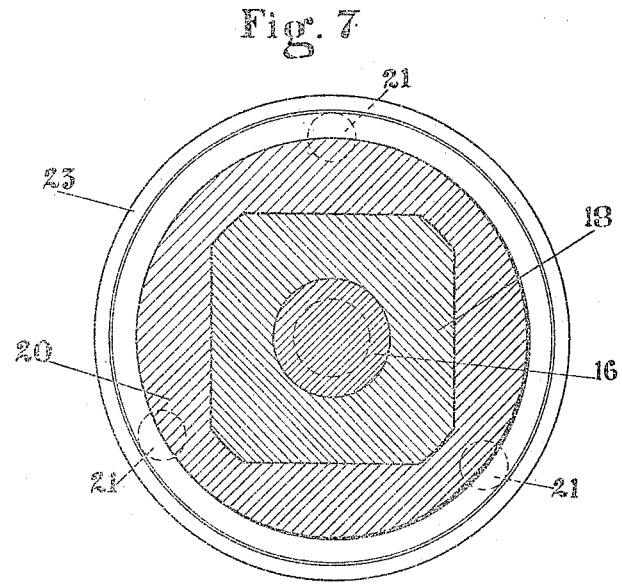

In the drawings, Figure 1 is a plan view of a transmission mechanism that embodies features of the invention, showing an arrangement of supporting hangers. Fig. 2 is a view in longitudinal vertical section of the mechanism. Fig. 3 is a view in detail of change speed gears and case, partially in longitudinal section and partially in elevation. Fig. 4 is a view in section on or about line $x$—$x$ of Fig. 3. Figs. 5 and 6 are views in detail of a reverse gear yoke. Fig. 7 is a view in section on line $y$—$y$ of Fig. 2 of a clutch transmission joint. Fig. 8 is a plan view, and Fig. 9 a side elevation of the slide gear operating means.

Referring to the drawings, the fixed or drive member 1 of a friction clutch is secured on the end of an engine shaft 2 against a flange 3 by bolts 4 passing through a mating flange 5 on a clutch shaft 6 alined with the shaft 2 or in other preferred suitable manner. A clutch sleeve 7 of a follower member has a bearing bushing 8 rotatable and longitudinally movable on the clutch shaft and carries a friction cone 9 with suitable facing 10 adapted to engage the member 1. A spring 11 is housed in the sleeve in compression between the sleeve end and a thrust collar 12 held by a stud 13 entering the clutch shaft end, a suitable ball bearing 14 being used to reduce end thrust friction. The sleeve may be reciprocated by the usual means such as a yoke lever, not shown, embracing the sleeve between its head and a peripheral flange 15. The above is a preferred form of clutch; any suitable form may be used having an axially reciprocable follower member.

The clutch sleeve is connected to the tapered end of a transmission drive shaft 16 by a telescoping joint permitting endwise play without binding. Preferably an outwardly squared male member 17 secured as by a key 18 and nut 19 to the tapered end, has sliding engagement with an outer female member 20 that abuts the sleeve head and is coupled thereto by dowel pins 21 in the head entering sockets in the member 20. A set-screw 22 of different pitch than the stud 13 is screwed axially through the stud into the shaft as a lock. A dust cover 23 secured on the female member telescoping over the sleeve head 77 completes the coupling joint, a suitably disposed screw 24 holding the parts together.

A transmission gear casing 25 is rigidly secured as by bolts 26 to a transversely disposed front hanger 27 that has a bearing 28 and bushing 29 for the transmission drive shaft 16, the coupling bolts being passed through the mating flanges around the bearing. A hollow cylindrical bearing boss 30 on the rear end of the casing in which the shaft 16 is likewise centered is rotatable or swiveled in a bearing bracket 31 of a rear hanger 32. Both hangers are adapted to be secured near their ends to the longitudinal members $a$ of a sub-frame, or like part of a chassis. The change-speed mechanism within the casing may be of any suitable design. Preferably a main drive pinion 33 is formed integrally on or made fast to the drive shaft 16 near the front hanger, and is in permanent mesh with the larger member 34 of a counter gear 35 journaled on a countershaft 36 in the casing 25, preferably below the drive shaft. A tubular follower shaft 37 rotatable on a bushing 38 on the shaft 16, and in a bushing 39 of the boss 30, has an exteriorly squared or polygonal portion 40 on which a sliding gear 41 may be reciprocated by a yoke 42 reciprocable on a shaft 43 coupled through a lever or rock arm 44 to a transverse rock shaft 45 in the casing. The sliding gear 41 is externally cut to mesh with the smaller member 46 of the countergear 35, and is internally cut to telescope or engage with the drive pinion 33, the latter having a face wider than the larger member 34 on the countergear 35 in order to permit this. The rock shaft is operated through a sector 47 in mesh with a segmental rack 48 carried by a rock arm 49 on a transverse shaft 50, the latter being adapted to be turned in the usual way by any preferred form of control lever.

A reverse gear 51 reciprocable and rotatable on a shaft 52 may be moved into simultaneous mesh with the counter-member 46 and the slide gear 41 when the latter clears the pinion 33. The gear is reciprocated by a yoke 53 sliding on a spindle 54 parallel to the drive shaft, that has a spring projected latch plug 56 with rounded end adapted to drop into shallow notches or flattened spots in the spindle. The yoke has a transverse slot in its upper side engaged by the rounded end 57 of a rocking lever 58 secured on a sleeve 59, the latter being turned by any suitable conventional means, as, for example, a segmental gear lever 60 meshing with a sector 61 carried by a sleeve 62 on the sleeve 59 and adapted to be operated by any suitable pedal or lever (not shown). As the yoke plug drops into the notches on the spindle 54 the operator can tell when the slide gear is in either of its operative positions, and the plug holds the gear in place when the control lever is released.

The rear end of the shaft 16 is counterbored, and endwise movement prevented by a collar 63, washer 64, stud 65 and locking set screw 66. A wide flange 67 on the end of the shaft 37, preferably integral therewith, is faced to receive the outer cup 68 of a universal joint connection of any preferred type to which it is attached by cap screws or like suitable means, with an inner member 69 adapted to be coupled to the rear axle driving mechanism. A finishing drum 70 or shield, conveniently clamped between the flange and cup base 71 or otherwise secured, completes the joint.

A removable cover 72 is secured in the casing, and the usual provisions for lubrication, adjustment for wear and the like are made, although not specifically illustrated or claimed herein.

In operation, the transmission mechanism as shown in Fig. 2 is out of gear. By moving the sliding gear so that the internal gear engages the drive pinion, the clutch sleeve and universal joint are directly coupled for high speed drive. When the sliding gear is in mesh with the counter-gear, the mechanism is in low speed position. When the sliding gear is in neutral position, coupling it with the countergear through the reverse gear, places the mechanism in reverse position.

One feature of the invention is the manner of coupling the parts which permits free endwise play between the parts without possibility of binding, and permitting the removal of the casing without taking down the clutch as the female member may be drawn on to the squared male member sufficiently to clear the end of the shaft, thus permitting the casing to be shifted laterally without striking the shaft. Another very important feature is the independent support afforded the transmission casing whereby it is free to rock laterally without throwing the parts of the driving mechanism out of alinement, any racking of the chassis frame not affecting the casing, owing to its central support. A further feature is the simplicity of the change-speed gearing, wherein the various speeds are obtained with the use of few gears, eliminating the complexity and multiplication of parts usual in such constructions.

Obviously, changes in the details of construction may be made without departing from the spirit of the invention, and I do not care to limit myself to any particular form or arrangement of parts.

What I claim as my invention is:—

1. The combination in an automobile, of an engine shaft, a driving member of a clutch secured thereon, a clutch shaft forming an axial extension of the engine shaft, a follower member of the clutch rotatable and longitudinally reciprocable on the clutch shaft, a transmission mechanism driving shaft in alinement with the clutch shaft, a male coupling member non-rotatably secured on the driving shaft, a female coupling member non-rotatable and longitudinally reciprocable on the male member over which it may be moved to clear the clutch shaft, a sleeve on the follower clutch member abutting the female coupling member and dowels on the sleeve detachably engaging and driving the female coupling member.

2. The combination in an automobile, of an engine shaft, a driving member of a clutch secured thereon, a clutch shaft forming an axial extension of the engine shaft, a follower member of the clutch rotatable and longitudinally reciprocable on the clutch shaft, a transmission mechanism driving shaft, in alinement with the clutch shaft, a male coupling member non-rotatably secured on the driving shaft, a female coupling member non-rotatable and longitudinally reciprocable on the male member over which it may be moved to clear the clutch shaft, a sleeve on the follower clutch member abutting the female coupling member, dowels on the sleeve detachably engaging and driving the female coupling member, and a chassis on which the engine and driving shafts are secured in fixed relation, the coupling permitting the withdrawal of either without displacement of the other.

In testimony whereof I affix my signature in presence of two witnesses.

WALTER L. MARR.

Witnesses:
A. H. Goss,
N. D. Haskin.

Copies of this patent may be obtained for five cents each, by addressing the "Commissioner of Patents, Washington, D. C."